United States Patent
Okamoto et al.

(10) Patent No.: US 6,688,001 B2
(45) Date of Patent: Feb. 10, 2004

(54) METHOD AND APPARATUS OF WORKING PLAIN BEARING

(75) Inventors: Yutaka Okamoto, Nagoya (JP); Satoshi Imai, Nagoya (JP); Nobutaka Hiramatsu, Nagoya (JP); Hideo Ishikawa, Nagoya (JP); Takayuki Shibayama, Nagoya (JP); Mikio Suzuki, Nagoya (JP); Mitsuharu Sahashi, Nagoya (JP)

(73) Assignee: Daido Metal Company Ltd., Nagoya (JP)

( * ) Notice: Subject to any disclaimer, the term of this patent is extended or adjusted under 35 U.S.C. 154(b) by 96 days.

(21) Appl. No.: 10/090,619

(22) Filed: Mar. 6, 2002

(65) Prior Publication Data

US 2002/0124408 A1 Sep. 12, 2002

(30) Foreign Application Priority Data

Mar. 7, 2001 (JP) ........................................ 2001-063395

(51) Int. Cl.[7] .............................................. B21D 53/10
(52) U.S. Cl. ............................ 29/898.056; 29/898.042; 29/898.054; 29/34 R; 384/129; 384/191.2
(58) Field of Search ..................... 29/898.042, 898.054, 29/898.055, 898.056, 898.057, 898.058, 898.059, 557, 559, 33.52, 238, 34 R; 384/129, 191, 191.2, 191.4

(56) References Cited

U.S. PATENT DOCUMENTS 2,338,858 A * 1/1944 Lignian
2,814,856 A * 12/1957 Ward
5,274,921 A * 1/1994 Kawagoe et al.

FOREIGN PATENT DOCUMENTS

| GB | 1 380 947 | 1/1975 |
| GB | 2 163 687 A | 3/1986 |

* cited by examiner

Primary Examiner—Gregory Vidovich
Assistant Examiner—Eric B Compton
(74) Attorney, Agent, or Firm—Browdy and Neimark, P.L.L.C.

(57) ABSTRACT

There is provided a method of working a plain bearing and a working apparatus of the plain bearing, which make it easy to perform working by forming a plurality of inclined surfaces of different angles in portions on both sides of the inner peripheral surface of the bearing alloy metal of the plain bearing in the axial direction thereof. In the working method and apparatus, a working holder 18 is provided which has a groove 20 extending on the inner peripheral surface in the peripheral direction and portions on both sides of the groove in the transverse direction formed in step-like shape, a half bearing 11 is housed in the working holder 18, and both ends of the half bearing 11 in the peripheral direction are pressed by use of pressing means 24. Then, the half bearing undergoes plastic deformation so as to be fitted into the groove and both sides of the half bearing in the axial direction thereof come into abutment with the edges 22, 23 of the step-like portions and are deformed in a polygonal line form. In this state, both ends of the half bearing 11 in the axial direction thereof are cut along one cylindrical surface by use of a broach 19. As a result, two inclined surfaces of different angles are continuously formed in the portions of both sides of the bearing alloy metal 13 of the half bearing in the axial direction thereof.

9 Claims, 7 Drawing Sheets

METHOD AND APPARATUS OF WORKING PLAIN BEARING

BACKGROUND OF THE INVENTION

1. Field of the Invention

The present invention relates to a method of working a plain bearing provided with a plurality of inclined surfaces of different inclination angles, which extend continuously in portions of the inner peripheral surface of a bearing alloy layer on both sides in the axial direction thereof, and a working apparatus of this plain bearing.

2. Related Art

Figure 8:
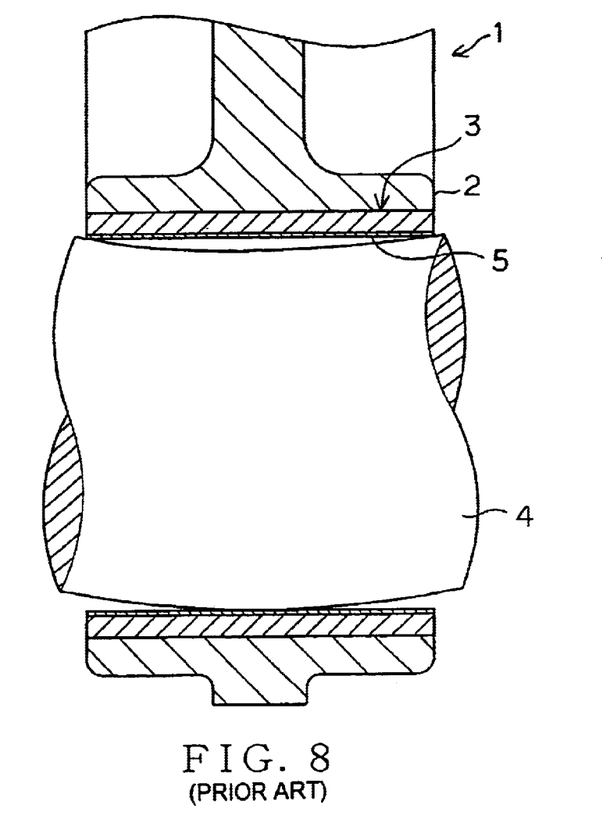
FIG. 8 is a partial sectional view of a connecting rod for the explanation of problems in a conventional plain bearing.

FIG. 8 shows the structure of a bearing on, for example, the large-end side of a connecting rod of an engine. A connecting rod 1 functions to receive the combustion pressure of a fuel from a piston and to transmit this combustion pressure to a crank shaft. A plain bearing 3 is provided at a large end 2, and a crank pin 4 is supported by this plain bearing 3. The crank pin 4 receives a combustion pressure from the connecting rod 1 and deflects in a circular-arc shape. Then, the crank pin 4 comes into uneven contact with portions of both ends of the bearing surface of the plain bearing 3.

Figure 7:
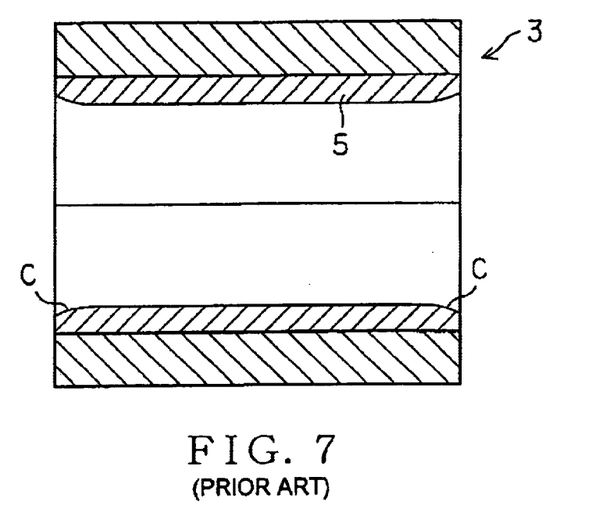
FIG. 7 is a sectional view of a crowning shape on an inner peripheral surface of a bearing alloy of a conventional plain bearing.

When the crank pin 4 comes into contact with both ends of the plain bearing 3, the thickness of a lubricating oil film of the portions becomes thin, with the result that the oil film becomes liable to be broken due to variations in load and rotation speed, etc. And, when the breakdown of an oil film occurs, direct contact of the bearing metal 5 of the plain bearing 3 with the crank pin 4, i.e., what is called metal-to-metal contact occurs, causing early premature wear and seizure of the plain bearing. Conventionally, therefore, as shown in FIG. 7, portions of the inner peripheral surface of the bearing metal 5 of plain bearing 3 at both ends thereof in the axial direction were formed in a circular-arc convex shape in section (what is called a crowning shape C), whereby uneven contact with both ends of the plain bearing 3 is prevented even when the crank pin 4 deflects.

On the other hand, working both ends of the inner peripheral surface of the bearing metal in a circular-arc convex shape is performed only with a high degree of difficulty in working, bringing about an increase in manufacturing costs. Accordingly, an idea of creating a pseudo-crowning shape by forming a plurality of inclined surfaces of different inclination angles in the portions of both ends of the bearing metal has been produced, and various methods of making such plain bearings have been examined. However, an effective method that permits easy working has not yet been found out.

SUMMARY OF THE INVENTION

The present invention was made in the light of the above situation and the object of the invention is to provide a method of working a plain bearing and a working apparatus of this plain bearing, which readily permit the realization of working for continuously forming a plurality of inclined surfaces having different angles in portions of the inner peripheral surface of a bearing metal on both sides thereof in the axial direction thereof.

According to this invention, a working holder is provided which has a groove extending on the inner surface thereof in the peripheral direction and step-like portions formed on both sides of the groove in the transverse direction thereto; the plain bearing is fitted in the groove of the working holder and both sides of the plain bearing in the axial direction thereof are pressed against a plurality of edges of the step-like portions; and in this state, the portions of the plain bearing on both sides thereof in the axial direction are cut along one cylindrical surface. Accordingly, it is possible to readily perform the working for continuously forming a plurality of inclined surfaces having different angles in portions of the inner peripheral surface of a bearing metal on both sides thereof in the axial direction.

DETAILED DESCRIPTION OF THE PREFERRED EMBODIMENTS

On the basis of an embodiment in which the invention is applied to a plain bearing for a crank pin to be attached to a connecting rod of an engine for vehicles, the invention will be described below with reference to FIGS. 1 to 6.

Figure 5:
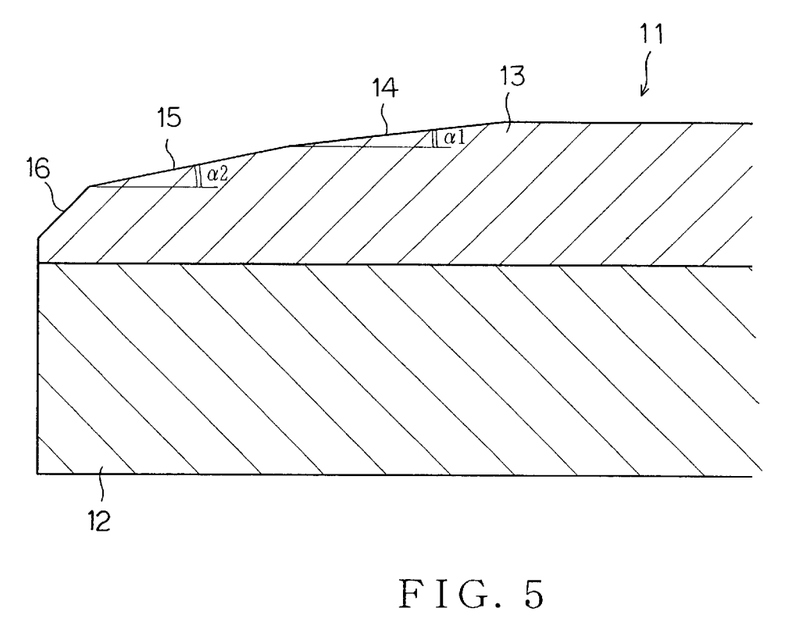
FIG. 5 is an enlarged sectional view of a half bearing on one side thereof in the axial direction.
Figure 6:
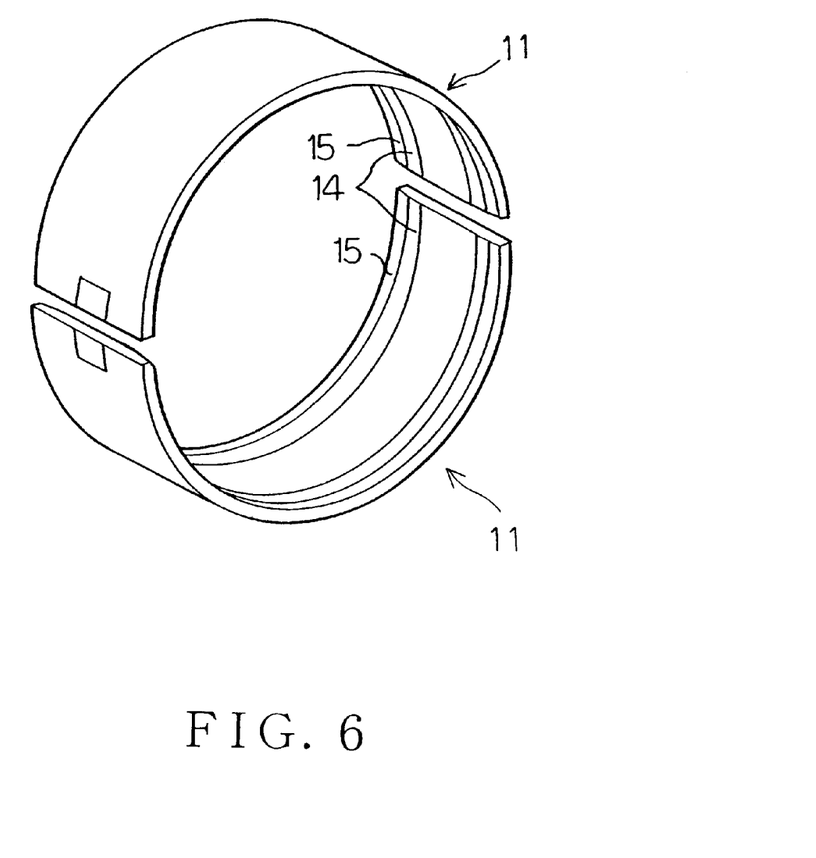
FIG. 6 is a perspective view of half bearings.

A plain bearing for a crank pin to be attached to the large end of a connecting rod, is constituted in cylindrical form, as shown in FIG. 6, by butting two half bearings 11 against each other. As shown in FIG. 5, the half bearing 11 is formed by covering a back metal 12 with a Cu-base or Al-base bearing alloy 13. The surface of the bearing metal 13 may be coated with an overlay layer. Incidentally, in FIG. 5 is shown only either of the two ends of the half bearing 11 in the direction of the axis.

On both sides of the inner peripheral surface of the bearing metal 13 in the axial direction thereof, the inner peripheral surface being the bearing surface of the above half bearing 11, there are continuously formed a plurality of inclined surfaces (practically, tapered surfaces) 14, 15 having different inclination angles in the axial direction thereof. In this case, the inclination angle $\alpha 1$ of the inclined surface 14 on the center side thereof in the axial direction is smaller than the inclination angle $\alpha 2$ of the inclined surface 15 on the end side. Further, the inclined surface denoted by the numeral 16 is provided by a chamfer of about 45 degrees formed at edges of the bearing metal 13 on both sides thereof in the axial direction.

Figure 4:
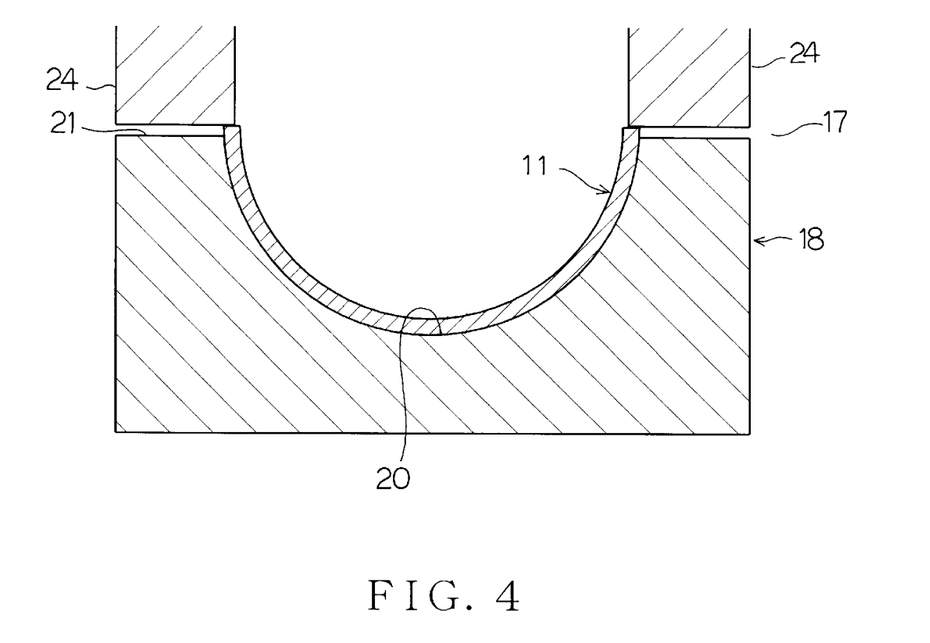
FIG. 4 is a longitudinal sectional view of a working apparatus.

Shown in FIG. 4 is a working apparatus 17 for working the inclined surfaces 14, 15 having different inclination angles on both sides of the inner peripheral surface of the bearing metal 13 in the axial direction thereof. As shown in the same figure, the working apparatus 17 is designed for cutting the half bearing 11 attached to a working holder 18 by use of a broach 19 as working means.

More specifically, the above working holder 18 is formed as a rectangular block whose center portion is cut out in semicircular shape, and which has a groove 20 extending on the inner peripheral surface in the peripheral direction, as shown in FIG. 1 to FIG. 3B. And the portions on both right and left sides of the groove 20 in the transverse direction thereof are formed in the shape of steps in such a manner that the steps become shallower by stages toward the outside. In the case of this embodiment, the number of step-like portions on both sides of the groove 20 are fixed at two so that two edges 22, 23 are formed in the area from the center side to a bank surface 21 outside the groove 21. Further, the width of the whole groove 20 including the step-like portions is set with a little narrower than the width of the half bearing 11.

Above the working holder 18 are provided pressing members 24 as pressing means. The pressing members 24 function to press both ends of the half bearing 11 in the peripheral direction so as to fit the half bearing 11 into the working holder 18. Additionally, the working holder 18 is attached, for example, to the bed of a hydraulic press, which is not shown in the figures, and the pressing members 24 are attached to a ram which moves up-and-down.

Figure 2:
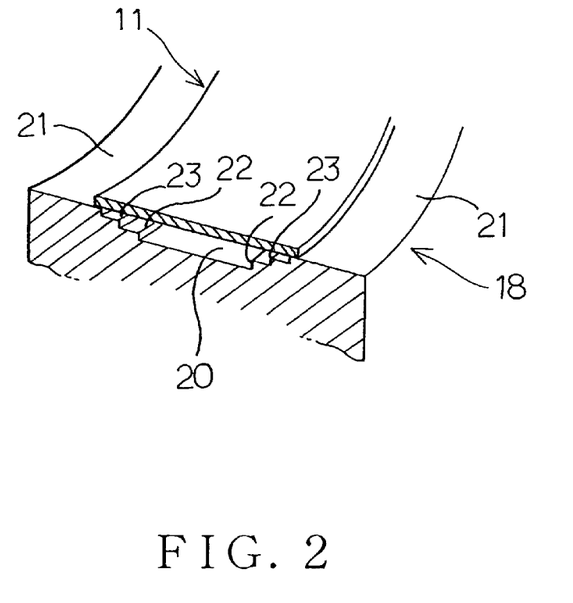
FIG. 2 is a partial perspective view of a half bearing received in a working holder, which shows broken-out surfaces of both of the half bearing and the working holder.
Figure 3A:
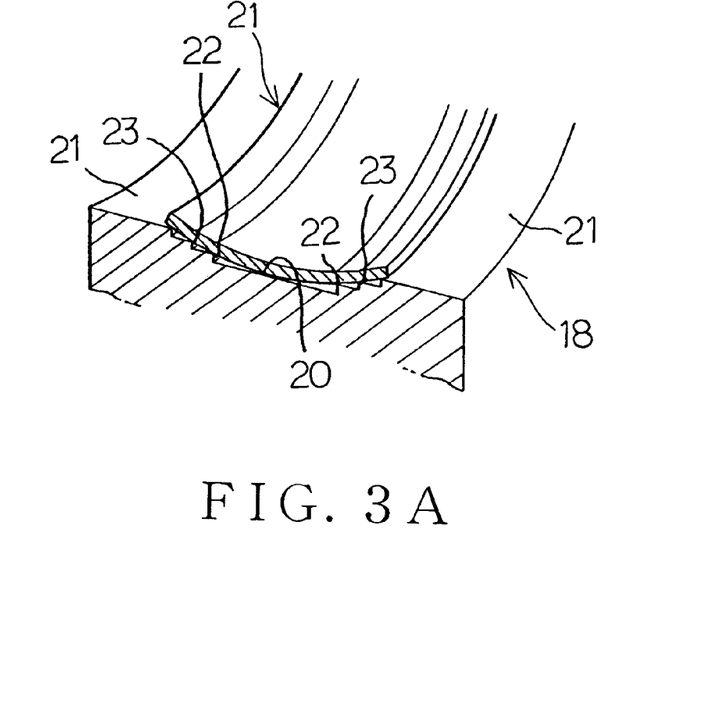
FIG. 3A is a partial perspective view of a half bearing during cutting, which shows broken-out surfaces of both of the half bearing and the working holder.
Figure 3B:
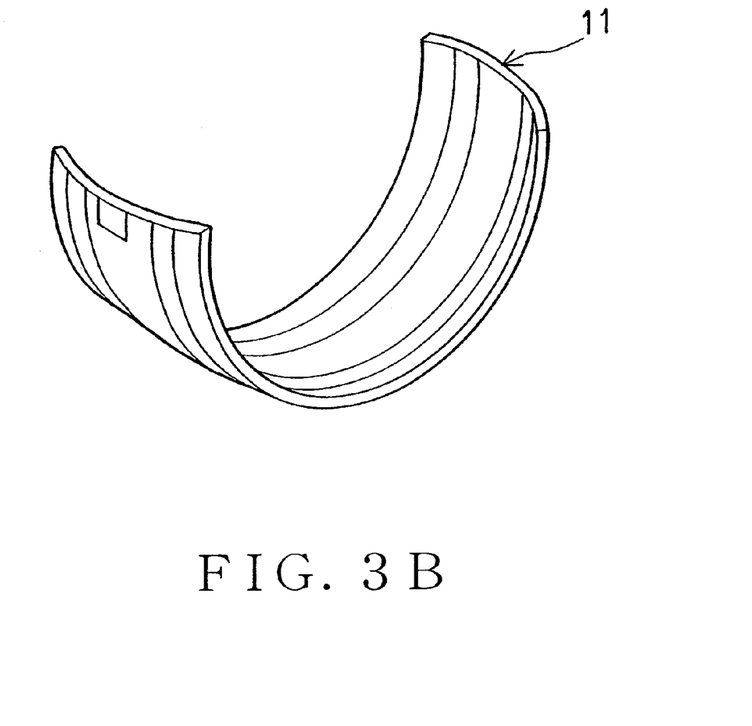
FIG. 3B is also a perspective view, which shows the deflected state of a half bearing in a working holder.

In order to form the inclined surfaces 14, 15 on both sides of the half bearing 11 in the axial direction thereof, as shown in FIG. 2 the half bearing 11 is housed in the working holder 18 and the ram of a press not shown in the figures is lowered. Then, the pressing members 24 come into abutment with both ends of the half bearing in the circumferential direction to thereby press the half bearing 11. For this reason, the half bearing 11 receives downward pressing forces, and first the bottom-side (back-surface) portion of the half bearing 11 is elastically deformed and is fitted into the groove 20. Then, as shown in FIG. 3, when the bottom-side (back-surface) portion of the half bearing 11 is fitted into the groove 20 of the working holder 18 and the center portion in the axial direction thereof comes into abutment with the bottom surface of the groove 20, other portions also receive forces that work in such a manner that the center portion in the axial direction thereof bulges outward, with the result that the whole half bearing 11 is plastically deformed so as to be completely fitted into the groove 20.

Figure 1:
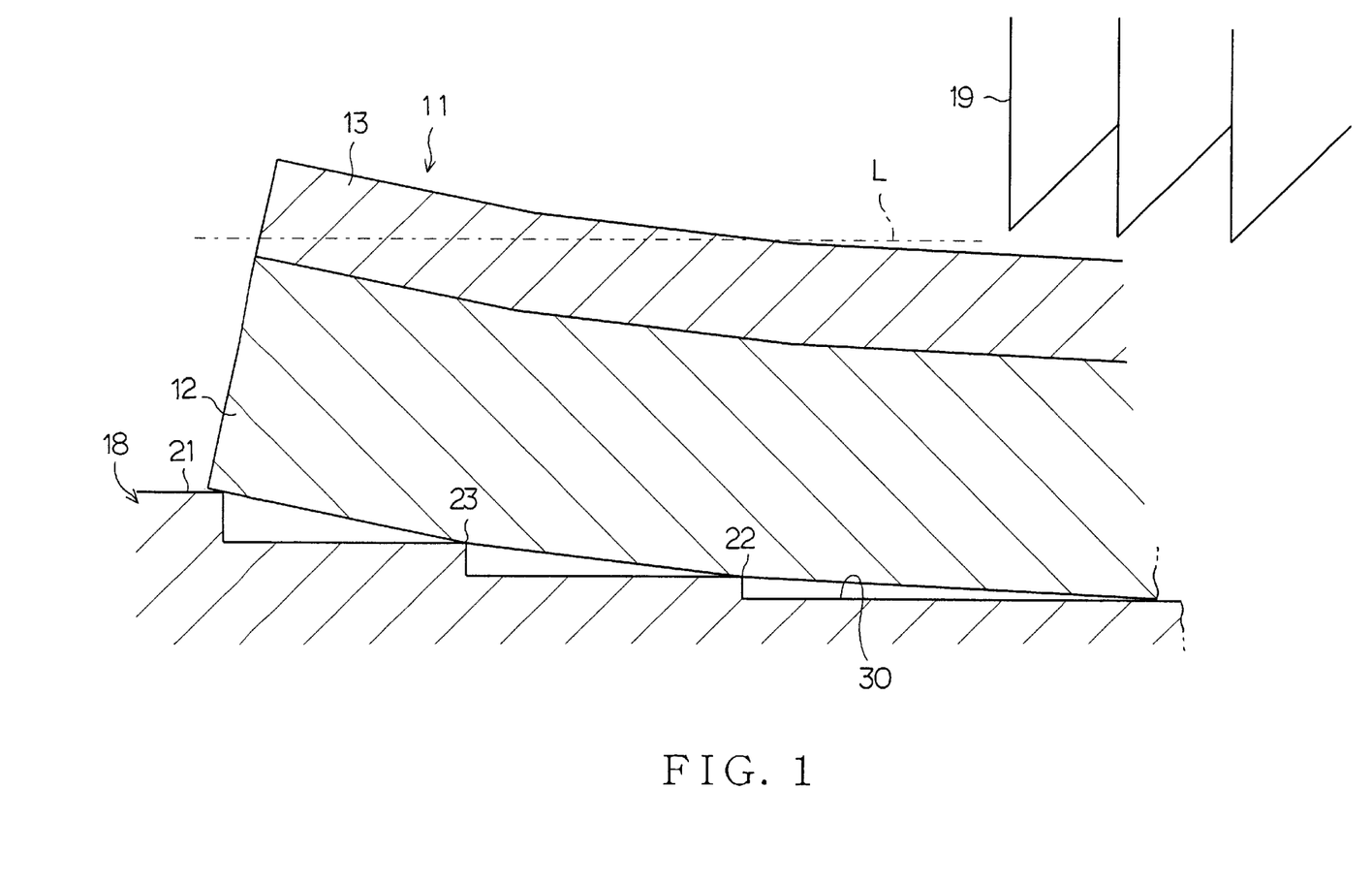
FIG. 1 a longitudinal sectional view of an essential part of an embodiment of the invention.

In this case, because the portions on both right and left sides of the groove 20 are formed in the shape of steps, as shown in FIG. 1 both sides of the half bearing 11 in the axial direction thereof come into abutment with the edges 22, 23 of step-like portions and the deformation is locally suppressed in the portions of the half bearing 11 that came into abutment with the edges 22, 23. As a result, the portions from both ends in the axial direction thereof to the edges 22, 23 are bent approximately in polygonal line form rather than in circular-arc form.

In this state, the circular broach 19 whose center axis coincides with that of the half bearing 11 is moved in the axial direction thereof. By this operation, both sides of the half bearing 11 in the axial direction thereof are cut along one cylindrical surface (indicated by a cut line L in FIG. 1). After that, the ram of the press is raised to thereby separate the pressing members 24 from the half bearing 11. When the pressing members 24 have moved upward, the half bearing 11 from which the pressing forces have been relieved restores to the original state by its own rebound. In this restored state, the portions of both sides of the half bearing 11 in the axial direction thereof do not assume a circular-arc shape in section, but they have a configuration in which the inclined surfaces 14, 15 having almost linear inclinations are continuously formed, thereby obtaining a pseudo-crowning shape.

Thus, according to this embodiment, by employing a simple method by which both sides of the half bearing 11 in the axial direction thereof are cut by use of the broach 19 with the half bearing 11 kept held by the pressing members 24, it is possible to form the plurality of inclined surfaces 14, 15, which linearly incline to both sides of the half bearing 11 in the axial direction thereof, and hence the manufacturing cost for obtaining a pseudo-crowning shape can be reduced.

Further, the present invention is not limited to the embodiment described above and shown in the drawings, and expansions or modifications as described below are possible.

The number of inclined surfaces formed on both sides of the half bearing 11 in the axial direction thereof is not limited to two, and three or more inclined surfaces may be formed.

The working of the inclined surfaces 14, 15 is not limited to broaching, and these inclined surfaces may be worked by cutting by use of a lathe, drilling machine, boring machine, etc.

The bearing in which the inclined surfaces are formed on both sides in the axial direction thereof is not limited to a half bearing, and a bearing of cylindrical shape may be used. In this case, the working holder may be a type which has a cylindrical hole for housing the plain bearing or a type in which two half blocks are combined with each other so as to form a cylindrical hole for housing the plain bearing. For a method of causing elastic deformation so that a cylindrical bearing can be fitted into the groove 20, means for pressing the cylindrical bearing from both sides thereof in the axial direction may be used or, in the case where two half blocks are combined with each other, a method of which both sides of the plain bearing in the axial direction are pressed between the two blocks may be employed.

What is claimed is:

1. A method of working a plain bearing provided with a plurality of inclined surfaces having different inclination angles, which extend continuously in portions of the inner peripheral surface of a bearing alloy metal layer on both sides thereof in the axial direction, the method comprising the steps of:

providing a working holder, said working holder having a groove which extends in a peripheral direction on an inner surface thereof and step-like portions formed on both sides of the groove in the transverse direction thereof so as to become shallower virtually in stages;

fitting said plain bearing in the groove of said holder to press both sides of said plain bearing in the axial direction thereof against a plurality of edges of said step-like portions; and cutting, in this state, the portions of the plain bearing on both sides thereof in the axial direction along one cylindrical surface.

2. A method of working a plain bearing according to claim 1, wherein the inclined surfaces of said working holder in the portions of the inner peripheral surface of bearing alloy metal layer in the axial direction thereof are at least two inclined surfaces.

3. A method of working a plain bearing according to claim 1, wherein said plain bearing is formed as a half bearing, and after housing said plain bearing in the groove of said working holder, both ends of said plain bearing in the axial direction thereof are pressed by use of pressing members to fit said plain bearing into said groove.

4. A method of working a plain bearing according to claim 1, wherein said cutting is performed by the working of the portion on the interior side of both ends of said plain bearing in the axial direction thereof by use of a lathe, a drilling machine or a boring machine.

5. An apparatus of working a plain bearing provided with a plurality of inclined surfaces having different inclination angles, which extend continuously in portions of an inner peripheral surface of a bearing alloy metal layer on both sides thereof in the axial direction, the apparatus comprising:

- a working holder having a groove extending on an inner surface thereof in the peripheral direction and step-like portions formed on both sides of the groove in the transverse direction so as to make the step-like portions shallower in stages;
- pressing means for pressing both ends of said plain bearing in the axial direction thereof against a plurality of edges of said step-like portions to fit said plain bearing in the groove of said working holder; and
- cutting means, for cutting portions of both sides of the inner peripheral surface of said plain bearing in the axial direction thereof along one cylindrical surface, with said bearing being pressed against said working holder by use of said pressing means.

6. A working apparatus of a plain bearing according to claim 5, wherein the step-like portions of said working holder has at least two steps in order to correspond to the inclined surfaces on both sides of said bearing in the axial direction thereof.

7. A working apparatus of a plain bearing according to claim 5, wherein said working holder comprises half blocks or is formed in a cylindrical shape.

8. A working apparatus of a plain bearing according to claim 5, wherein said pressing means presses both ends of the plain bearing in the axial direction thereof, which are fitted into the groove of said working holder, against edges of said step-like portions by pressing both ends of the plain bearing in the axial direction thereof in the direction of interior of said groove.

9. A working apparatus of a plain bearing according to claim 5, wherein said cutting is performed by broaching or working by use of a lathe, drilling machine or boring machine.

* * * * *